United States Patent
Söderman et al.

(10) Patent No.: US 7,148,264 B2
(45) Date of Patent: *Dec. 12, 2006

(54) METHOD OF PRODUCING MACROPOROUS CROSS-LINKED POLYMER PARTICLES

(75) Inventors: Tobias Söderman, Uppsala (SE); Anders Larsson, Uppsala (SE); Philippe Busson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 10/915,290

(22) Filed: Aug. 9, 2004

(65) Prior Publication Data

US 2005/0035061 A1 Feb. 17, 2005

Related U.S. Application Data

(63) Continuation-in-part of application No. PCT/SE03/00868, filed on May 27, 2003.

(30) Foreign Application Priority Data

May 30, 2002 (SE) .................................... 0201623

(51) Int. Cl.
*C08F 16/32* (2006.01)

(52) U.S. Cl. .............................. 521/53; 521/61; 521/63; 521/64; 521/142; 521/159; 521/189; 210/198.2; 210/502.1

(58) Field of Classification Search .................. 521/53, 521/61, 63, 64, 142, 159, 189; 210/198.2, 210/502.1
See application file for complete search history.

(56) References Cited

U.S. PATENT DOCUMENTS 4,568,706 A 2/1986 Noetzel et al.
5,135,740 A * 8/1992 Katz et al. .................. 424/401
5,334,310 A 8/1994 Frechet et al.

FOREIGN PATENT DOCUMENTS

| EP | 1 179 732 | 3/2004 |
| JP | 55-145528 | * 11/1980 |
| WO | WO 95/013861 | 5/1995 |
| WO | WO 99/044053 | 9/1999 |
| WO | WO 02/040559 | 5/2002 |
| WO | WO 03/046063 | 6/2003 |
| WO | WO 03/102040 | 12/2003 |

OTHER PUBLICATIONS

Benson et al., Polymeric Columns for Liquid Chromatography, J. Chromatogr. Sci., vol. 22, 1984, pp. 386-399, (hereinafter "Benson").*
C. Hirayama et al., "Porous Polymer Packings from Vinyl Ether Derivatives for Reversed-Phase Liquid Chromatography", Chromatographia, vol. 33, No. 1/2, Jan. 1992, p. 19-24.
J. Benson, et al., "Polymeric Columns for Liquid Chromatography", Journal of Chromatographic Science, vol. 22, Sep. 1984, p. 386-399.
Rudin, A., The Elements of Polymer Science and Engineering, Second Edition, Academic Press, 1999, p. 332.

* cited by examiner

*Primary Examiner*—Irina S. Zemel
(74) *Attorney, Agent, or Firm*—Yonggang Ji

(57) ABSTRACT

The present invention relates to a method of producing one or more macroporous cross-linked polymer particles, which comprises polymerization and cross-linking of divinyl ether monomers in an inert solvent, in which method the polymerization is free radical initiated. The invention also relates to particles so produced, which are useful as separation medium e.g. in RPC or, after suitable derivatization, in other chromatographic methods.

4 Claims, 5 Drawing Sheets

Pore size distribution of polymer 1

Pore size distribution of polymer 2:

Pore size distribution of Polymer 3:

METHOD OF PRODUCING MACROPOROUS CROSS-LINKED POLYMER PARTICLES

CROSS-REFERENCE TO RELATED APPLICATIONS

This application is a continuation-in-part of international patent application number PCT/SE03/00868, filed May 27, 2003, published on Dec. 11, 2003 as WO 03/102040 and also claims priority to patent application number 0201623-6 filed in Sweden on May 30, 2002; the disclosures of which are incorporated herein by reference in their entireties.

TECHNICAL FIELD

The present invention relates to the production of macroporous cross-linked polymeric particles useful as packings or carrier of ligands in chromatographic methods as well as to macroporous cross-linked polymeric particles as such.

BACKGROUND OF THE INVENTION

There are numerous methods of chromatography available today, such as ion exchange chromatography (IEX), hydrophobic interaction chromatography (HIC), reversed phase chromatography (RPC), affinity chromatography, gel filtration etc. The feature that distinguishes chromatography from most other physical and chemical methods of separation is that two mutually immiscible phases are brought into contact wherein one phase is stationary and the other mobile. The sample mixture, introduced into the mobile phase, undergoes a series of interactions i.e. partitions many times between the stationary and mobile phases as it is being carried through the system by the mobile phase. Interactions exploit differences in the physical or chemical properties of the components in the sample. These differences govern the rate of migration of the individual components under the influence of a mobile phase moving through the stationary phase. Separated components emerge in a certain order, depending on their interaction with the stationary phase. The least retained component elutes first, the most strongly retained material elutes last. Separation is obtained when one component is retarded sufficiently to prevent overlap with the zone of an adjacent solute as sample components elute from the column.

Chromatographic separation methods are useful e.g. for recovery of biomolecules, such as nucleic acids and proteins, and small organic molecules from liquids. In addition, chromatographic separation methods can also be used for recovery of liquids, in which case impurities such as organic or inorganic molecules are removed to result in a liquid of higher purity.

The matrix used in chromatography is composed of a carrier material, which is usually in the form of particles, monolithic matrices or the like. In some applications, such as RPC, the surface of the carrier itself will provide the interaction with the target molecules. In other applications, such as ion exchange or affinity chromatography, the carrier has been provided with ligands that comprise charged groups or affinity groups for interaction with target molecules. In either case, the carrier materials used can be classified as inorganic materials, such as silica, and organic material, including the groups of synthetic polymers, such as poly(divinylbenzene) (DVB) and poly(divinylbenzene/styrene), and native polymers, such as agarose.

Silica has been used for several years as chromatography beads. However, a general problem with silica is that it is susceptible to hydrolysis in basic conditions, and accordingly the conventional cleaning in place (cip) procedure using sodium hydroxide is not suitable in this case. For the same reason, silica matrices cannot be operated in chromatography under high pH conditions, which severely limits their use in a wide range of applications. More recently, alkyl-bonded silica particles have been suggested for reversed phase liquid chromatography. However, alkyl-bonded silica contains residual silanol groups or impurities, which in some cases results in peak tailing and a poor chromatographic performance in general.

Matrices based on native organic polymers, such as polysaccharides and especially agarose, are used for many chromatographic applications, especially in a derivatised form since the hydroxyl groups available on their surfaces render them easy to derivatise. Agarose particles can be cross-linked by addition of a chemical cross-linker, and they will become porous as a result of the gelling procedure. The nature of such particles is generally known as gelporous, and such gelporous particles are in general less advantageous in procedures where high pressures are used.

Matrices based on synthetic organic polymers, such as divinylbenzene (DVB) and styrene, on the other hand are tolerant to cleaning in place, but their aromatic groups can sometimes cause undesired effects in chromatographic methods. More specifically, if such a matrix is used to adsorb molecules that also comprise aromatic groups, an interaction between their respective $\pi$ electrons will occur, resulting in peak tailing and long retention times. A disadvantage of DVB based matrices is that they often exhibit a large proportion of undesired micropores, which results in impaired mass transfer properties in chromatography. It has been hypothesised that these micropores, which are especially disadvantageous in RPC, are produced as a result of the rapid polymerisation of DVB monomers in suspension polymerisation. Another disadvantage of styrene based matrices appears in cases where it is desired to derivatise the surface of the particle to change its properties, since this kind of matrices exhibit a chemical inertness that in most cases necessitates several surface modification steps before the desired change can be achieved. A further disadvantage of organic polymer-based polymers such as styrene and DVB is that they are somewhat compressible at the high-pressure conditions that are used in high-performance separation methods.

In order to provide improvements to the above-discussed groups of matrix materials, newer alternatives have been presented. For example, in order to produce improved preparative ion exchange chromatography matrices of improved mechanical and chemical stability, Britsch et al (Recovery of Biological Products) have suggested a copolymer synthesised of a mixture of hydrophilic vinyl ether and a bifunctional acrylamide monomer. The resulting product is accordingly based on amide type cross-linking. However, as is well known, acrylamide requires care to be taken when handled to avoid negative health effects, which will result in a more cumbersome and inconvenient process. Furthermore, the hydrolysis sensitivity of amides in general may render this kind of matrices less advantageous for certain applications.

Ericsson et al (WO 95/13861) have disclosed a separation method, wherein hydrophilic vinyl ether polymers attached to a support are used as a matrix. More specifically, the polymers suggested therein comprise a poly(vinyl ether) chain comprising identical or different vinyl subunits, and the support is illustrated with agarose particles. The polymers are synthesised using cationic polymerisation.

Further, in order to avoid the disadvantages of alkyl-bonded silica matrices and polymer matrices in reversed phase liquid chromatography, Hirayama et al (Chromatographia Vol. 33, No 1/2, January 1992, 19–24) suggest suspension copolymerisation of alkylvinyl ether with triethylene glycol divinyl ether. Thus, in this method, the organic phase was comprised of two different kinds of reactive vinyl ether monomers, the mutual ratio of which was used to set a specific hydrophobicity of the resulting product.

U.S. Pat. No. 5,334,310 discloses a liquid chromatographic column that contains a separation medium in the form of a macroporous polymer plug, also known as a monolith. The polymerisation mixture from which the plug is prepared contains at least one polyvinyl monomer, a free radical generating initiator and a porogen. The so prepared plug contains small pores of diameters less than about 200 nm as well as large pores of diameters greater than about 600 nm. Such a large pore diameter range is advantageous for monoliths to allow a high flow rate, but clearly above the useful pore diameter ranges in polymer particles intended for chromatography.

EP 1 179 732 presents a solution as regards how to produce a polymer adsorbent that exhibits selected porosity and permeability characteristics. This has been achieved by a method, preferably a suspension polymerisation method, wherein selected mixed porogens in selected proportions relative to the monomer are used. The thereby produced adsorbent is due to its rigidity especially suitable for use as an RPC stationary phase at high-pressure conditions.

Accordingly, since the various groups of chromatographic matrix materials exhibit certain advantages and disadvantages, it is often the case that the matrix used is selected depending on the kind of target molecule, the purpose of the separation etc. Alternatively, two or more different chromatographic principles and/or different matrix materials are sometimes combined into sequence of chromatographic steps, often denoted polishing, capture etc. Thus, each separation principle can be viewed as one tool useful in a toolbox, where there is a constant need of new tools. Accordingly, despite the known matrix materials discussed above, there is still a need of novel methods to use as supplement, i.e. as further tools in a tool box.

SUMMARY OF THE INVENTION

Accordingly, one object of the present invention is to provide a novel material useful as a matrix in chromatographic separation methods, which exhibits properties that differ from known materials. This is achieved by providing macroporous cross-linked polymer particles, which have been polymerised from divinyl ether monomers as defined in claim 1.

Another object of the invention is to provide such polymer particles, which result in novel selectivity patterns when used as a matrix in chromatography, such as RPC for protein separation.

Yet another object of the invention is to provide polymer particles as described above, the surfaces of which are easily derivatised e.g. with functional groups for ion exchange or affinity chromatography, with hydrophobic groups for hydrophobic interaction chromatography (HIC) or any other groups that change the properties of the particle surface in a desired way. This is achieved by providing macroporous cross-linked polymer particles that exhibit a sufficient number of vinyl groups available for reaction on their surfaces.

A specific object of the invention is to provide polymer particles wherein the average pore size has been carefully controlled.

Yet another object of the invention is to provide polymer particles as described above, that fulfil one or more of the criteria above and at the same time exhibit an advantageous mechanical stability and consequently withstand high pressures when packed in chromatographic columns.

One more object of the present invention is to provide a method of producing a novel material as mentioned above, in which method the average pore size of the final product is carefully controlled.

An additional object of the present invention is to provide a method of producing macroporous cross-linked polymer particles, wherein the polymerisation rate is slower than for prior art polymerisations of divinyl benzene and styrene. This can be desired for various reasons, one of which is that it appears to result in a macroporous structure with less micropores.

One or more of the above-defined objects can be achieved as defined in the appended claims. Further objects and advantages of the invention appear from the detailed description that follows.

Definitions

The term "chromatography" is used herein to include dynamic as well as batch procedures.

The term "matrix" is used herein to denote a material that is useful as a stationary phase in chromatography. Accordingly, e.g. an RPC matrix will normally be comprised of one material throughout each bead, while an ion exchange matrix will denote a carrier provided with ligands that comprise functional groups for binding target molecules.

The term "macroporous particles" means particles that are porous both in a dry or wet state, as compared to gelporous particles that are porous only in the wet state.

The term "particle" means herein a chromatographic carrier of essentially spherical shape. The term "divinyl ether" means herein bifunctional vinyl ether, wherein the two functions are two vinyl ether groups. Thus, in the context of vinyl ethers, the term bifunctional refers to the function of an unsaturated carbon-carbon bond.

The term "porogen" refers to an inert solvent (low molecular weight or polymeric) present during the polymerisation reaction that gives rise to the formation of a macroporous polymer at some stage during the polymerisation.

The term "inert" means being unreactive, i.e. not capable of participating in a chemical reaction such as polymerisation.

The term polyether refers to a polymer comprising one or more ether groups with the general formula (I)

$$X-O-(-R-O-)_n-Y \qquad (I)$$

where X and Y may, or may not be identical end groups, for instance alkyl, aryl or hydrogen groups, for example hydrogen, methyl, ethyl, tert-butyl or phenyl groups. R is an alkyl or aryl group, linear or branched, which may contain other functional groups, (e.g. carboxylic acid groups, hydroxyl groups or amines, etc) and n is an integer between 2 and 10000, such as between 3 and 5000, or preferably between 5 and 100.

DESCRIPTION OF THE PREFERRED EMBODIMENTS

A first aspect of the present invention is a method of producing one or more macroporous cross-linked polymer particles, which comprises polymerisation and cross-linking of divinyl ether monomers in an inert solvent, wherein the polymerisation is free radical initiated and the divinyl ethers monomers are defined by the chemical formula (II)

  (II)

wherein R can be any group that does not interfere chemically or sterically with the polymerisation.

In one embodiment, the divinyl ether monomers are selected from the group that consists of cyclohexanedimethanol divinyl ether, butanediol divinyl ether and diethyleneglycol divinyl ether.

The macroporous cross-linked polymer particles according to the invention polymers can for example be prepared according to the basic principles of conventional suspension polymerisation (see e.g. J. R. Benson and D. J. Woo, J. Chromatographic Sci., 1984, 22, 386). In brief, an organic solution comprising the desired divinyl ether monomers is mixed with an inert solvent (also denoted porogen in this context) and a thermal initiator and contacted with an aqueous phase containing water, an emulsifying agent and optionally other additives. The organic phase and the aqueous phase will form a suspension that is stirred, preferably mechanically, until the desired droplet size is obtained. The suspension is then heated to an elevated temperature, typically 65° C., which will lead to thermal decomposition of the initiator and thereby to initiation of the polymerisation. The suspension will be kept at an elevated temperature until the polymerisation is considered to be complete, which may typically occur after about 24 hours. The resulting macroporous particles can easily be separated from the aqueous phase e.g. on a sintered glass filter, and subsequently be washed with water and/or organic solvents to remove the emulsifier and the porogen, respectively. Accordingly, the divinyl ether monomers will act as monomers during the polymerisation as well as cross-linkers. As will be discussed in more detail in the experimental part below, a deliberate choice of a solvent of a small or large molecular weight can be utilised to produce a correspondingly small or large average pore size.

In the most advantageous embodiment of the present method, the polymerisation is free radical initiated. The free radical initiator can be any suitable commercially available initiator, based e.g. on diacetyl peroxide, dibenzoyl peroxide, dilauroyl peroxide, t-butyl peroxypivalate, t-butyl peroctoate, t-amyl peroxypivalate, t-butyl peroxy-2-ethylhexanoate, di-(4-t-butylcyclohexyl)peroxydicarbonate, 2,2'-azobis(isobutyronitrile), 2,2'-azo-bis(2,4-dimethylvaleronitrile), or 1,1'-azobis(cyanocyclohexane), and mixtures thereof. Specific examples are the products V65 (=2,2'-azo-bis(2,4-dimethylvaleronitrile, Wako Pure Chemical Industries) or AIBN (=2,2'-azobis(isobutyronitrile), from Acros Organics). The choice of the free radical initiator is easily made by the skilled in this field considering the other conditions and reagents used, which will be discussed in more detail below. The amount thereof is not critical, as long as it is considered that too large an excess thereof might have a negative impact on the polymerisation, while a too small amount may not be sufficient for the desired result. Accordingly, an illustrative amount of radical initiator is within the range of 1–10 mole % (per monomer), such as 1–2 mole %.

DETAILED DESCRIPTION OF THE INVENTION

Figure 1:
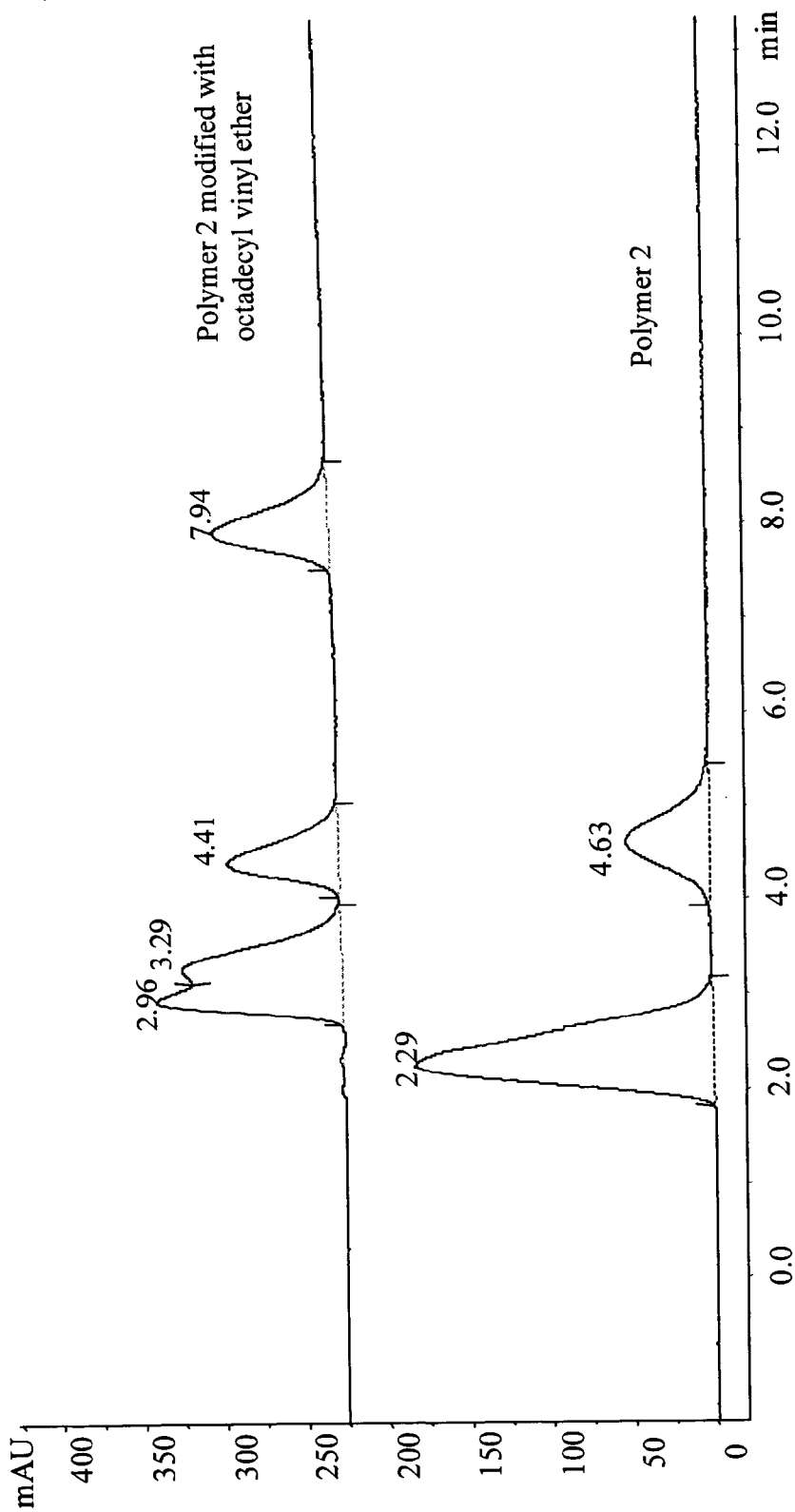
FIG. 1 shows separation of 4 different peptides on an underivatised macroporous polymer particle and a macroporous polymer made more hydrophobic by chemical modification with octadecyl vinyl ether.

Thus, the present invention relates to a method of producing cross-linked macroporous polymer particles by polymerisation of divinyl ethers in an inert solvent. Even though divinyl ethers have been polymerised for other purposes, such as in surface coatings application, their advantages as cross-linkers in methods to provide macroporous polymer particles have not been fully appreciated before. Vinyl ethers can successfully be polymerised by a cationic mechanism to yield high molecular weight polymers. On the contrary, vinyl ethers polymerise poorly by a free radical mechanism in traditional low-molecular weight solvents. For this reason, vinyl ethers have not to this point been considered for the synthesis of macroporous polymer particles by suspension polymerisation. Furthermore, suspension polymerisation has not been considered to be a suitable polymerisation technique for cationic polymerisations, since it is carried out in the presence of water, and cationic polymerisations are known to be very sensitive to moisture.

However, the present inventors have shown that by using divinyl ethers as cross-linkers in a method which is initiated by free radical chemistry and wherein an inert solvent is used, such particles can successfully be prepared. Furthermore, particles produced have been shown to exhibit a novel kind of selectivity pattern when used as matrices in chromatographic separation methods, as will be illustrated in the experimental part below.

The present invention relates to the use of an inert solvent in suspension polymerisation of divinyl ethers. In this context, it is understood that the solvent is not capable of actively participating in the polymerisation process other than by dissolving the reactive monomers. Thus, the inert solvent used in the present method does not comprise any vinyl groups, i.e. it does not comprise any polymerisable carbon-carbon double bonds. Accordingly, the present invention clearly differs from the above-discussed Hirayama et al, wherein two reactive monomers but no solvent are used. Further, in conventional methods for polymerisation of polymer particles used as matrices in chromatography, such as DVB and styrene, solvents such as toluene, heptane, hexanol and other low molecule weight compounds have been used. In order to increase the pore size, it has been suggested to add smaller amounts of polymers to such conventional solvents, but the mixtures so obtained have been composed to a substantial extent of small molecular weight components. These low molecule weight compounds or mixtures have been a convenient tool to obtain a desired pore size. On the contrary, the present invention shows that use of a relatively high molecule weight solvent comprising ether groups can enable the production of macroporous cross-linked polymer particles from divinyl ethers. Thus, in one specific embodiment, the present method uses a polymeric solvent, wherein the average molecular weight of the polymer is above at least 60 g/mole, e.g. above about 100 g/mole, or at least above about 1000 g/mole.

Suitable inert solvents can be selected among the following, all of which are commercially available or readily produced by standard methods:

Aliphatic hydrocarbons, aromatic hydrocarbons, halogenated hydrocarbons, alcohols, esters, ketones, ethers, liquid polymers or solutions of solid polymers in suitable solvents. These inert solvents can be used alone or in any desirable mixture, depending on the intended pore size and pore size distribution.

Examples of suitable solvents are poly(propylene glycol), dibutyl ether, heptane, poly(vinyl ethyl ether), dodecanol, 2-ethyl hexanol, hexyl acetate and toluene.

As the skilled person in this field will readily appreciate, depending on the monomer or monomer mixture that is used, the choice of different inert solvents will largely affect the obtained porous structure.

Some solvents will accordingly give mainly large pores e.g. poly(propylene glycol) Mw 2000 in combination with cyclohexane dimethanol divinyl ether or heptane in combination with triethylene glycol divinyl ether and divinyl benzene. Other solvents on the other hand will give mainly small pores, e.g. poly(propylene glycol) monobutyl ether in combination with cyclohexane dimethanol divinyl ether. To obtain intermediate pore sizes, mixtures of inert solvents can naturally be used.

In a specific embodiment, the polyether solvent is selected from the group that consists of poly(ethylene glycol) (PEG), polypropylene glycol (PPG) and poly(tetrahydrofuran). All these solvents are obtainable from commercial sources, such as Aldrich. In this context, it should be understood that the present invention also encompasses any mixture of two or more of the above-described solvents.

As regards the divinyl ether monomers used for the present polymerisation, in one embodiment, they are one or more linear, branched or cyclic alkyl, aryl or polymeric divinyl ether monomers. Thus, the divinyl ethers used according to the present invention can be characterised by the chemical formula (II)

C=C—O—R—O—C=C  (II)

wherein R can be any group that does not interfere chemically or sterically with the polymerisation. Accordingly, some illustrative examples of suitable R groups are a linear, branched or cyclic alkyl or aryl chain or polymer, such as ethyl, butyl, hexyl or polyethylene glycol, polypropylene glycol or polytetrahydrofuran, or combinations thereof.

In a specific embodiment, the divinyl ether monomers are selected from the group that consists of cyclohexanedimethanol divinyl ether, butanediol divinyl ether or diethyleneglycol divinyl ether. Thus, the R group may be a cyclohexane dimethylene group. As the skilled person in this field will realise, the choice of divinyl ether monomers will affect the nature of the polymer particle. Accordingly, if a hydrophobic particle is desired, such as for RPC, then cyclohexanedimethanol divinyl ether is selected, while if a more hydrophilic particle is desired, then diethyleneglycol divinyl ether is preferably used.

Many divinyl ether monomers that are useful in the present polymerisation are commercially available, e.g. cyclohexanedimethanol divinyl ether, butanediol divinyl ether or diethyleneglycol divinyl ether (all available from Aldrich).

Alternatively, the divinyl ether monomers used as starting material can be obtained by synthesis according to well-known methods, see e.g. WO 95/13861.

As mentioned above, the present method is based on the polymerisation and cross-linking of one or more divinyl ethers. However, the monomer mixture used as starting material in the present polymerisation can also comprise other monomers, such as monomers comprising one vinyl group and/or monomers comprising at least two such vinyl groups. In one embodiment, the starting material comprises, in addition to one or more divinyl ether monomers, a monomer that comprises one vinyl group which will be able to participate in polymerisation by reacting said vinyl group and one other functional group, which is not a vinyl group. Such a non-vinyl functional group can e.g. be a hydroxyl, an amine, a chlorine, or any other group that can be useful for other purposes than forming the cross-linked polymeric structure of the present particle. Accordingly, the skilled person who uses the method according to the invention can easily decide what kind of further functionalities that are needed for each intended purpose, such as an easily accessible chemical handle for further derivatisation other than via the residual vinyl groups etc. In an alternative embodiment, the present polymerisation is performed in the presence of another monomer in addition to the divinyl ethers, which comprises one vinyl group and no other functionality. Such other monomer can for example comprise a long hydrophobic aliphatic chain or aromatic group, and including such a monomer will result in a more hydrophobic surface of the particle. Thus, in this embodiment, the present invention provides a very versatile method, that can be designed depending on the intended use of the particles produced thereby.

In one embodiment, the present method also comprises a step of modification of the surface of the macroporous particles produced as described above. In an advantageous embodiment, the surface is modified with a compound that comprises a group which is a readily derivatised functionality, such as a hydroxyl group, which is suitable if a hydrophilic particle is desired. The hydroxyl may be derivatised e.g. with glycidol. Plural molecules of glycidol may be polymerically attached to the hydroxyl by addition of boron trifluoride etherate to produce a covalent coating comprising polymer chains including plural hydroxyls. Alternatively, hydroxyls may be oxidised to produce plural carboxylic acid groups. In another embodiment, the hydroxyl may be reacted with a compound such as an epihalohydrin, such as epibromohydrin, to produce a terminal halide on the covalent coating, which may be reacted with an amine to produce a quaternary amine. An alternative advantageous method of modifying the surface is by grafting, see e.g. International patent application PCT/SE02/02159. In the present specification, grafting of a polymer surface with a hydrophobic group, namely octadecyl vinyl ether, is described in Example 1 below. Thus, modification of the surface of a macroporous particle according to the invention is easily performed by the skilled person in this field according to any well-known method.

A second aspect of the present invention is a macroporous cross-linked polymer particle, which is comprised of cross-linked divinyl ether polymers. In a specific embodiment, the present particles are comprised of polymers of one or more further subunits than divinyl ethers. The particles according to the invention can exhibit an average particle size diameter within the interval of about 2–600 µm, such as about 2–150 µm, more preferably about 3–100 µm and most preferably in the interval of about 5–30 µm.

In a specific embodiment, the macroporous cross-linked polymer particle according to the invention has been produced as described above. Thus, more details regarding this embodiment are found above.

A third aspect of the present invention is a reversed phase chromatographic (RPC) method wherein one or more macroporous polymer particles comprised of cross-linked divinyl ethers are used to separate e.g. a protein, peptide, oligonucleotide or smaller organic molecule from a liquid. The principles of RPC are well-known to the skilled person in this field.

As appears from the above, a fourth aspect of the present invention is chemical derivatisation of macroporous polymer particles comprised of cross-linked divinyl ethers with hydrophobic or hydrophilic monofunctional vinyl compounds e.g. monofunctional vinyl ethers or styrene.

A fifth aspect of the present invention is the use of divinyl ether monomers in a suspension polymerisation initiated by radical reactions. In the preferred embodiment, the suspension polymerisation is performed in an inert solvent, as discussed in detail above.

FIG. 1 shows separation of 4 different peptides on macroporous cyclohexane dimethanol divinyl ether particles (Polymer 2) according to the invention (upper), which has been made more hydrophobic by chemical modification with octadecyl vinyl ether, and on the same macroporous polymer particle (Polymer 2) without derivatisation (lower). Polymer 2 according to the invention was prepared as described in example 1 below.

The chromatographic evaluation was performed according to example 3. In the upper chromatogram, from left to right, Ile$^7$-angiotensin III (2.96); Val$^4$-angiotensin III (3.29); angiotensin III (4.41) and angiotensin I (7.94) are shown, and four distinct peaks can be discerned. As clearly appears, the separation of Val$^4$-angiotensin m, angiotensin III and angiotensin I is excellent. However, this is not the case for the underivatised material (lower chromatogram), where Ile$^7$-angiotensin III, Val$^4$-angiotensin III and angiotensin III coelute (2.29) and are separated in retention time only from angiotensin I (4.63).

Figure 2:
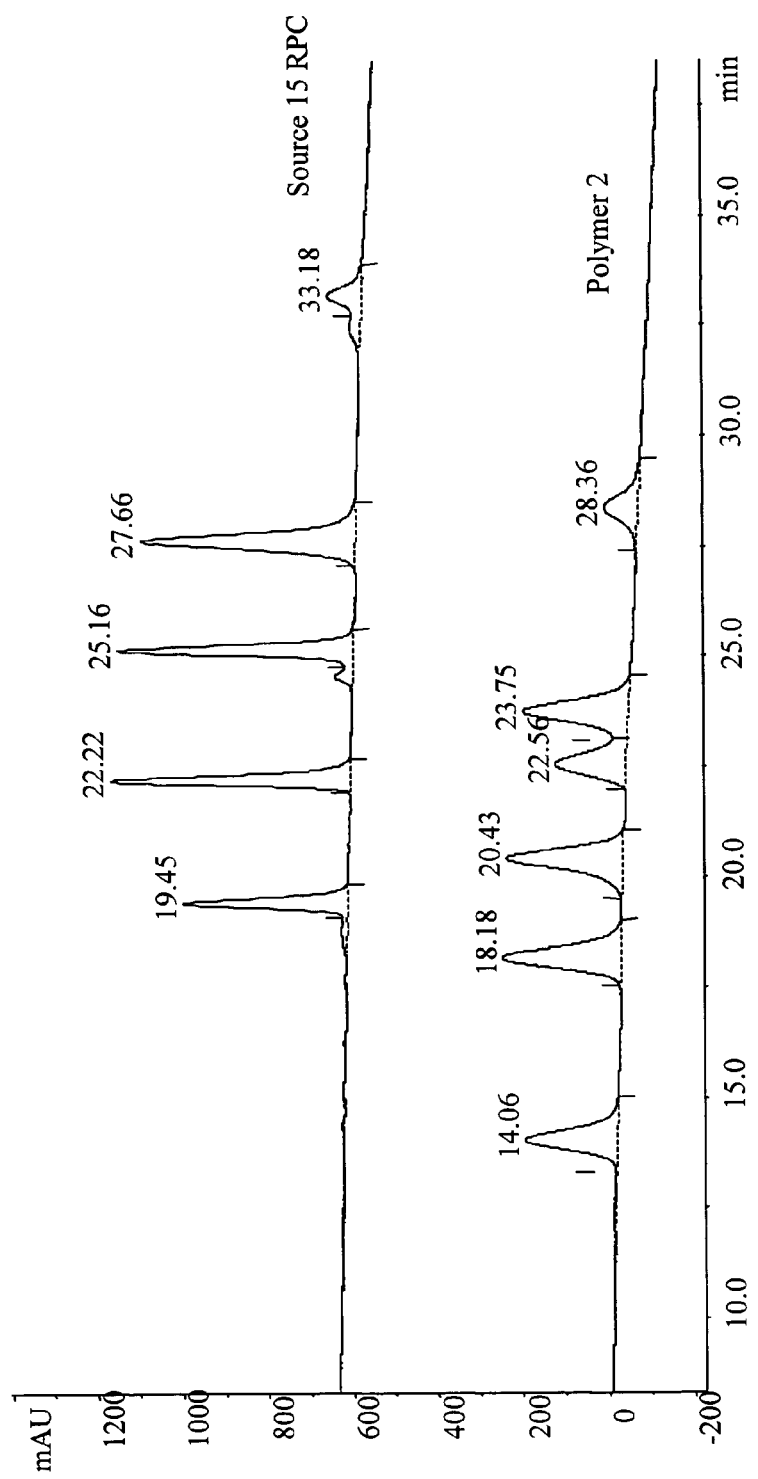
FIG. 2 shows the separation of 6 proteins and illustrates the difference in selectivity between divinyl ether particles according to the invention and prior art DVB/Styrene particles.

FIG. 2 shows the separation of 6 proteins as described in example 3 and illustrates the difference in selectivity between cyclohexane dimethanol divinyl ether particles (Polymer 2) according to the invention (lower) and prior art DVB/styrene particles (Source™ 15 RPC, available from Amersham Biosciences AB, Uppsala, Sweden) (upper). It should be noted that the particle size of polymer 2 is larger (average diameter 25 µm) than Source™ 15 RPC (average diameter 15 µm), which results in somewhat broader peaks.

From left to right, the upper chromatogram shows ribonuclease (19.45); insulin (22.22); lysozyme (25.16); bovine serum albumin (BSA) and α-chymotrypsin (27.66); and ovalbumin (33.18), while the lower chromatogram shows ribonuclease (14.06); insulin (18.18); lysozyme (20.43); bovine serum albumin (BSA) (22.56); α-chymotrypsin (23.75); and ovalbumin (28.36). The retention times are generally shorter for polymer 2 compared to Source 15™ RPC. This is a positive feature, since less organic solvent is required for the separation. This improves the process economy, which is especially important for large-scale separations.

Moreover, the separation pattern is clearly different between polymer 2 and Source™ 15 RPC. For example, Ovalbumin is better separated from α-chymotrypsin with Source™ 15 RPC than with Polymer 2.

However, base line separation between BSA and α-chymotrypsin is almost obtained with polymer 2, whereas these two proteins coelute with Source™ 15 RPC. Another difference is that ribonuclease and insulin are even better separated with Polymer 2 than with Source™ 15 RPC.

Figure 3:
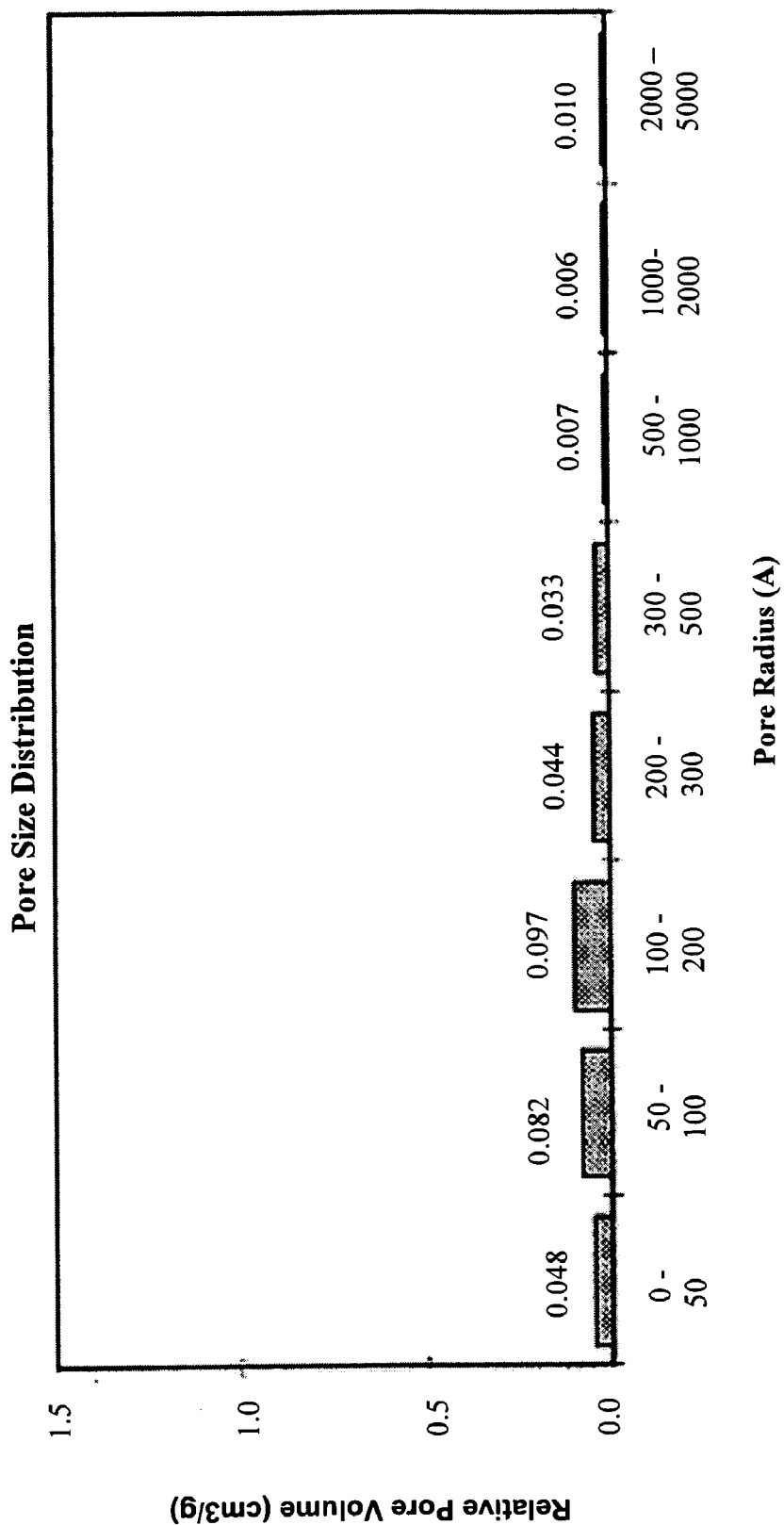
FIG. 3A–C show the pore size distributions of three macroporous polymer particles of the present invention.
Figure 3:
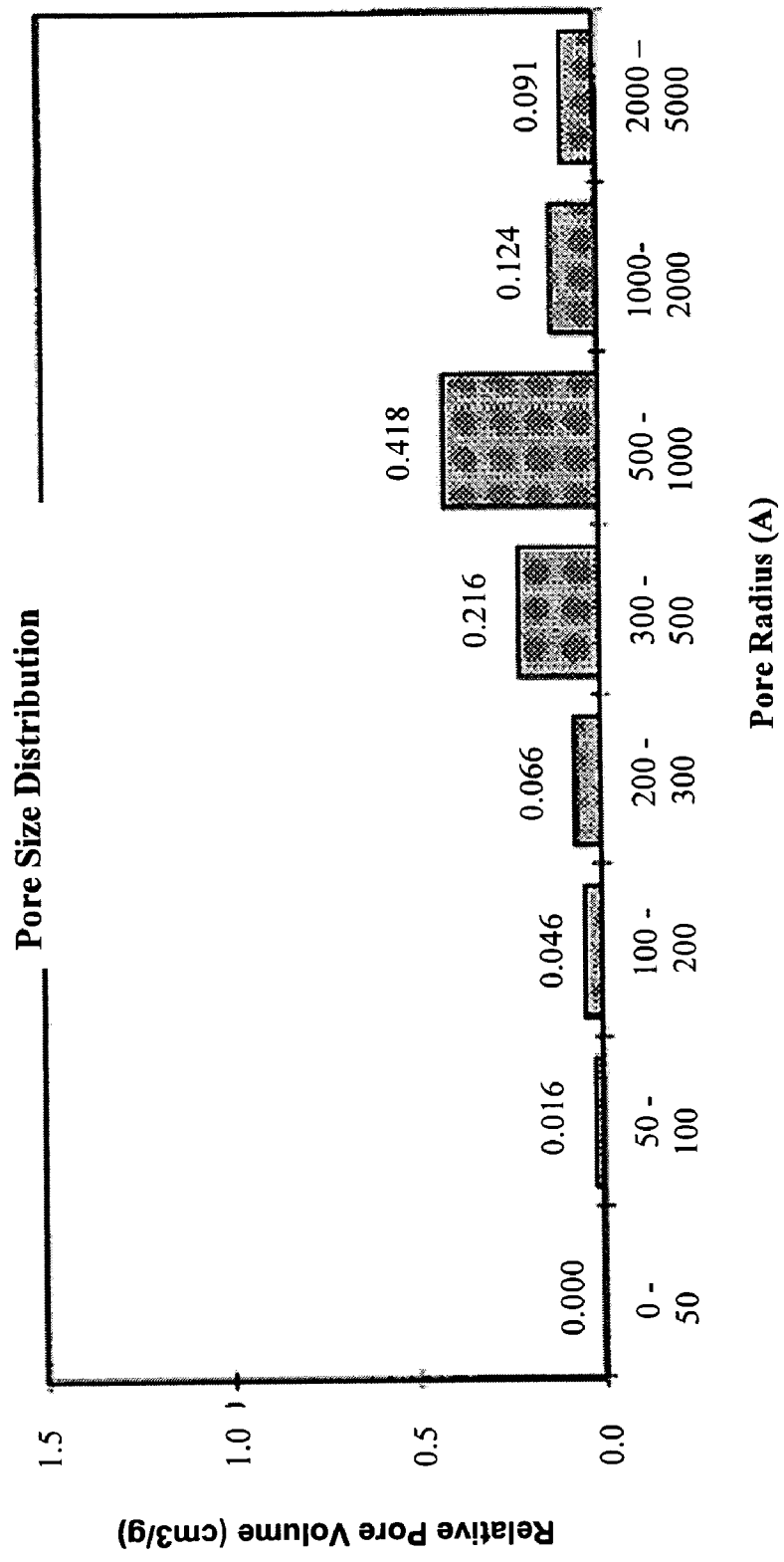
Figure 3:
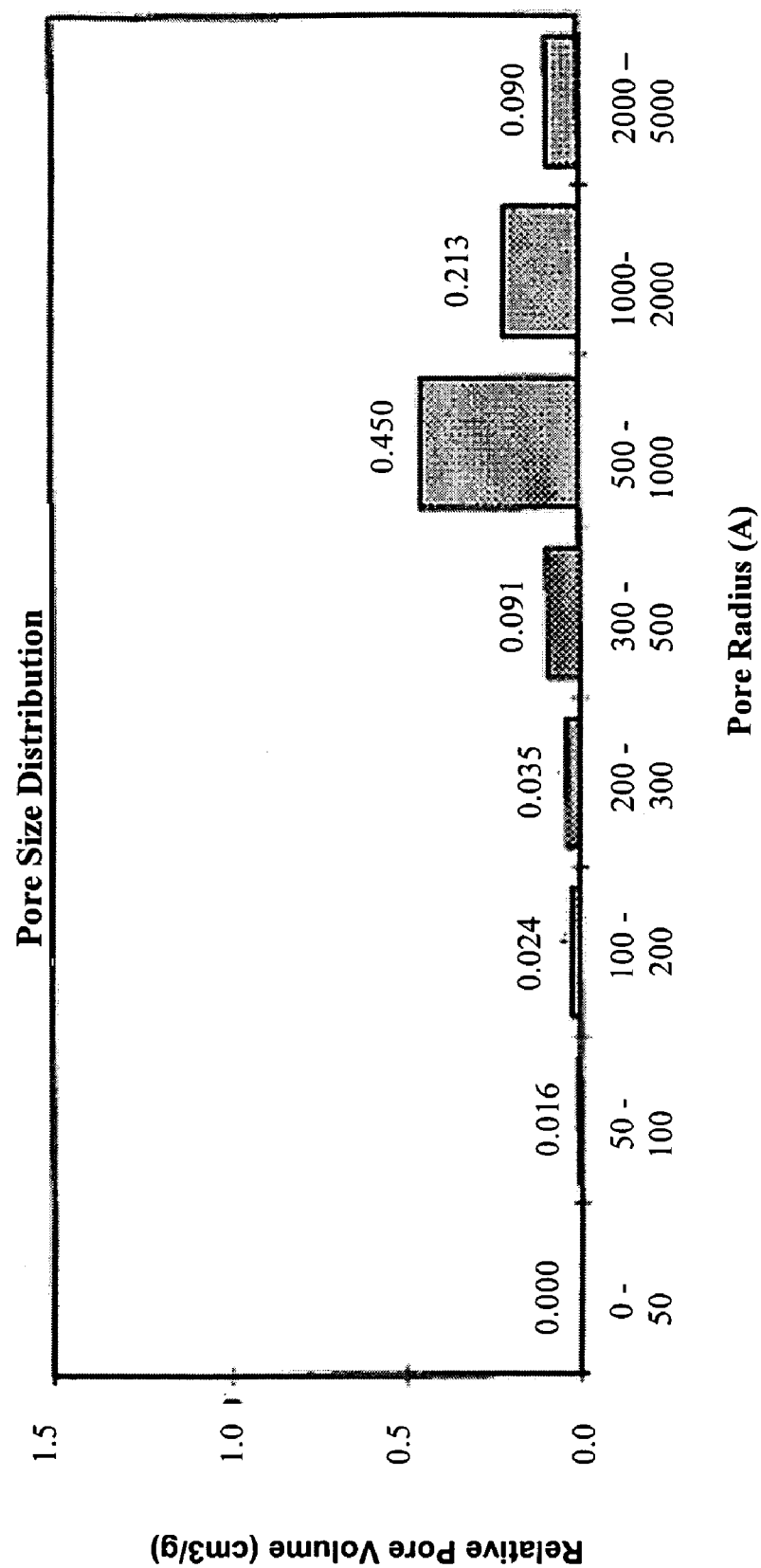

FIG. 3A–C show the pore size distributions of three macroporous polymer particles (Polymer 1, Polymer 2 and Polymer 3, respectively) of the present invention as described in example 4. The effect on the average pore size of the average molecular weight of the polypropylene glycol can clearly be seen. A higher molecular weight polypropylene glycol results in a larger average pore size.

Moreover, the amount of pores with radii below 50 Å is extremely low, which is assumed to be highly advantageous in chromatographic applications.

EXAMPLES

Below, the present invention will be illustrated by way of examples. However, the present examples are provided for illustrative purposes only and should not be construed as limiting the present invention as defined by the appended claims. All references given below and elsewhere in the present specification are hereby included herein by reference.

Example 1

Preparation of Macroporous Polymer Particles of the Present Invention

An organic monomer phase was prepared in a 50 mL beaker by combining the following ingredients:

10 mL 1,4-cyclohexanedimethanol divinyl ether (CHDVE) (98%) (available from Sigma-Aldrich), 6.7 mL PPG ($M_w$ 425, also available from Sigma-Aldrich) and 200 mg V65 was stirred for 30 minutes under a nitrogen atmosphere.

An aqueous phase was prepared in a 250 mL three-necked round-bottom flask equipped with a condenser, a mechanical stirrer and a nitrogen inlet by combining the following ingredients:

160 mL distilled water, 8 g Mowiol 40–88, poly(vinyl alcohol), 88% hydrolysed available from Clariant) and 4.8 g NaCl (p.a.). The solution was stirred at 250 rpm while the temperature was raised rapidly to 65° C., where it was kept for five hours. The solution was then cooled over a 2 h period by air-cooling. After complete dissolution of the solid components, agitation was stopped, and the organic phase (prepared as described above) was added to the round-bottom flask.

The reaction mixture (combined organic and aqueous phases) was stirred at 540 rpm for 30 minutes under a nitrogen atmosphere. This resulted in organic droplets with an average diameter of approximately 20 µm. The round-bottom flask was then heated to 65° C. over a period of 20 minutes. The reaction mixture was kept at 65° C. for 24 h to polymerise the reactants.

After the polymerisation reaction was complete, the reaction mixture was allowed to cool to ambient temperature under a nitrogen atmosphere. The suspension was transferred to a sintered-glass funnel and the aqueous phase was filtered from the polymer. The polymer was washed with 500 mL distilled water, 500 mL ethanol and 500 mL acetone and finally 100 mL 23% ethanol in water (v/v).

Example 2

Surface Modification of Macroporous Polymer Particles According to the Invention This example describes surface modification of the macroporous polymer particles of the present invention.

20 g of octadecyl vinyl ether (tech. 85%, available from Aldrich) was melted in a 50 mL glass beaker at 65° C. for 30 minutes until everything was in the liquid form.

In a 50 mL three-necked round bottom flask equipped with a nitrogen inlet and a mechanical stirrer, the following ingredients were combined: 1.4 g of dry Polymer 2 (dried overnight at 65° C.), 14 mL of liquid octadecyl vinyl ether and 350 mg of V-65. The flask was rapidly heated to 65° C. The reaction mixture was kept at this temperature and stirred at 250 rpm under a nitrogen atmosphere for 19 h.

The reaction mixture was allowed to cool to ambient temperature and it was subsequently transferred to a sintered-glass funnel and washed with 500 mL of methanol and 500 mL of ethanol.

Example 3

Chromatographic Evaluation

This example describes the chromatographic evaluation of the macroporous polymer particles of the present invention for the separation of peptides and proteins.

Polymer samples of about 2.5 mL volume were packed into analytical steel columns (4.6 mm internal diameter and 15 cm length) and evaluated by performing two separations in aqueous solution, of four peptides and six proteins, respectively.

These tests were designed to determine if the polymer matrix allowed efficient mass transfer, to assess the capability of peptide and protein separation and to see how the selectivity differs from more conventional polystyrene/divinyl benzene polymers.

2 grams of dried polymer resin was mixed with 35 mL of ethanol and was allowed to stand for a minimum of 2 hours. The polymer slurry was then packed into a stainless steel column (available from Supelco, dimensions: inner diameter 4.6 mm, length 15 cm) by flow packing in ethanol at a linear velocity of 2150 cm/h until the pressure was stable. The quality of the column packing was confirmed by injecting a 50 μl pulse of 1 M sodium chloride solution in deionised water while flowing deionised water at a linear velocity of 361 cm/h. An ÄKTA™ explorer 10S HPLC system (Amersham Biosciences, Uppsala, Sweden) was used for all chromatographic evaluation. The efficiency (plates/meter) and asymmetry of the column was evaluated using Unicorn™3.1 software (Amersham Biosciences, Uppsala, Sweden). Target values for acceptable column packing parameters were a minimum of 6000 plates/meter and an asymmetry between 0.8 and 1.3.

Peptide Separation

A solution of four peptides, angiotensin I, angiotensin III, Val[4]-angiotensin III and Ile[7]-angiotensin III (all available from Sigma-Aldrich, except for angiotensin III which was purchased from ICN) at a concentration of 0.125 mg/mL was prepared. The aqueous buffer (here denoted buffer A) was 10 mM potassium phosphate buffer (adjusted to pH 3.0 with potassium hydroxide). The organic modifier (buffer B) was 100% acetonitrile, HPLC grade. The linear velocity was 361 cm/h. The column was equilibrated with 10 column volumes (CVs) of 3% (v/v) B (1 CV=2.49 mL). 10 μl of the sample mixture was injected at a linear velocity of 361 cm/h. A gradient from 3% to 49% B over 10 CV is performed, followed by 2 CV at 49% B buffer. A gradient from 49% to 3% B buffer over 2 CV to restore the initial conditions, followed by reequilibration with 2 CVs 3% B buffer, is performed.

The results of the chromatography are presented in FIG. 1.

Protein Separation

Six proteins (ribonuclease, insulin, lysosyme, bovine serum albumin (BSA), α-chymotrypsin and ovalbumin, all available from Sigma-Aldrich) are included as target molecules in the protein separation assay.

All protein solutions are prepared as stock-solutions (10 mg/ml) that are kept in the freezer. The proteins are dissolved one by one in MilliQ-water, except for Insulin that needs acidic conditions to be dissolved (10 mM phosphate buffer pH 2.0).

The aqueous phase (here denoted buffer A) consisted of 0.1% (v/v) trifluoroacetic acid (TFA) in deionised water. The organic modifier (buffer B) was 100% acetonitrile, HPLC grade.

The injection solutions are prepared by diluting known volumes of stock solution with buffer A to a final protein concentration of 0.5 mg/ml.

The linear velocity was 361 cm/h. The column was equilibrated with 10 column volumes (CVs) of 97% (v/v) A (1 CV=2.49 mL in this case). 25 μl of the protein mixture was injected at a linear velocity of 361 cm/h. A gradient from 3% to 60% B over 15 CV is performed, followed by 2 CV at 60% B buffer. A gradient from 60% to 3% B buffer over 1 CV to restore the initial conditions, followed by reequilibration with 2 CVs 3% B buffer, is performed.

Example 4

Alteration of Pore Sizes

This example describes how the pore size of the macroporous particles according to the invention can be altered using polymeric polyether porogens of different molecular weight. All of the polymers described below are synthesised using the procedure described in example 1.

TABLE 1

| | Monomer | Porogen | % porogen (v/v) | Average pore size |
|---|---|---|---|---|
| Polymer 1 | Cyclohexanedimethanol divinyl ether | Polypropylene glycol average M.W. 425 | 40 | 130 |
| Polymer 2 | Cyclohexanedimethanol divinyl ether | Polypropylene glycol average M.W. 1000 | 40 | 546 |
| Polymer 3 | Cyclohexanedimethanol divinyl ether | Polypropylene glycol average M.W. 2000 | 40 | 882 |

Example 5

Copolymer of Triethylene Glycol Divinyl Ether and Divinyl Benzene

This example describes how a macroporous copolymer of triethylene glycol divinyl ether and divinyl benzene can be prepared with heptane as porogen.

An organic phase was prepared by combining the following components: 28.6 g triethylene glycol divinyl ether, 28.07 g divinyl benzene (both available from Sigma-Aldrich), 37.38 g heptane (Merck) and 1.75 g 2,2'-Azobis(2-methylbutyro nitrile) (AMBN), available from Fluka. The mixture was stirred for 30 minutes under a nitrogen atmosphere. The initiator is completely dissolved during this time period.

An aqueous phase was prepared by dissolving 40 g Methocel K-100 in 1000 g water at 60° C. overnight. The solution is then allowed to cool until it reaches room temperature.

331.5 g of the aqueous phase is added to a 500 mL jacketed reactor equipped with a nitrogen inlet and an anchor-type mechanical stirrer. The organic phase is added and the stirring speed is gently increased to 500 rpm. The suspension is stirred at 500 rpm for 30 minutes under a nitrogen atmosphere.

The temperature is raised to 70° C. and the reaction is left overnight under a nitrogen atmosphere.

After the polymerisation reaction was complete, the reaction mixture was allowed to cool to ambient temperature under a nitrogen atmosphere. The suspension was transferred to a sintered-glass funnel and the aqueous phase was filtered from the polymer. The polymer was washed with 1000 mL distilled water, 2000 mL ethanol and finally dried overnight at 65° C. overnight.

A macroporous polymer with an average pore diameter of 710 Å, as determined by mercury porosimetry following standard methods, was obtained.

Example 6

Copolymer of Cyclohexane Dimethanol Divinyl Ether and Divinyl Benzene

This example describes how a copolymer of cyclohexane dimethanol divinyl ether and divinyl benzene can be prepared with heptane as porogen.

An organic phase was prepared by combining the following components: 29.9 g cyclohexanedimethanol divinyl ether, 28.8 g divinyl benzene (both available from Sigma-Aldrich), 37.8 g heptane (Merck) and 1.71 g 2,2'-Azobis(2-methylbutyro nitrile) (AMBN), available from Fluka. The mixture was stirred for 30 minutes under a nitrogen atmosphere. The initiator is completely dissolved during this time period.

An aqueous phase was prepared by dissolving 50 g Methocel K-100 in 1000 g water at 60° C. overnight. The solution is then allowed to cool until it reaches room temperature.

331.5 g of the aqueous phase is added to a 500 mL jacketed reactor equipped with a nitrogen inlet and an anchor-type mechanical stirrer. The organic phase is added and the stirring speed is gently increased to 200 rpm. The suspension is stirred at 500 rpm for 60 minutes under a nitrogen atmosphere.

The temperature is raised to 70° C. and the reaction is left overnight under a nitrogen atmosphere.

After the polymerisation reaction was complete, the reaction mixture was allowed to cool to ambient temperature under a nitrogen atmosphere. The suspension was transferred to a sintered-glass funnel and the aqueous phase was filtered from the polymer. The polymer was washed with 1000 mL distilled water, 2000 mL ethanol, 1000 mL of toluene and finally 1000 mL of ethanol. The particles are dried overnight at 65° C.

A macroporous polymer with an average pore diameter of 848 Å, as determined by mercury porosimetry following standard methods, was obtained.

Example 7

Copolymer of Cyclohexane Dimethanol Divinyl Ether and Divinyl Benzene

This example describes how a macroporous copolymer of cyclohexane dimethanol divinyl ether and divinyl benzene can be prepared with toluene as porogen.

An organic phase was prepared by combining the following components: 28.5 g cyclohexanedimethanol divinyl ether, 28.1 g divinyl benzene (both available from Sigma-Aldrich), 37.4 g toluene (Merck) and 1.70 g 2,2'-Azobis(2-methylbutyro nitrile) (AMBN), available from Fluka. The mixture was stirred for 30 minutes under a nitrogen atmosphere. The initiator is completely dissolved during this time period.

An aqueous phase was prepared by dissolving 50 g Methocel K-100 in 1000 g water at 60° C. overnight. The solution is then allowed to cool until it reaches room temperature.

331.5 g of the aqueous phase is added to a 500 mL jacketed reactor equipped with a nitrogen inlet and a anchor-type mechanical stirrer. The organic phase is added and the stirring speed is gently increased to 190 rpm. The suspension is stirred at 190 rpm for 60 minutes under a nitrogen atmosphere.

The temperature is raised to 70° C. and the reaction is left overnight under a nitrogen atmosphere.

After the polymerisation reaction was complete, the reaction mixture was allowed to cool to ambient temperature under a nitrogen atmosphere. The suspension was transferred to a sintered-glass funnel and the aqueous phase was filtered from the polymer. The polymer was washed with 1000 mL distilled water and 2000 mL ethanol. The particles are dried overnight at 65° C.

A macroporous polymer is obtained with an average pore diameter of 634 Å, as determined by mercury porosimetry following standard methods, was obtained.

Example 8

Preparation of Macroporous Cyclohexane Dimethanol Divinyl Ether Particles

This example describes how a macroporous polymer of cyclohexane dimethanol divinyl ether can be prepared.

An organic phase was prepared by combining the following components: 112.0 g cyclohexanedimethanol divinyl ether, 74.8 Polypropylene glycol monobutyl ether (Mw 340) (both available from Sigma-Aldrich), and 3.37 g 2,2'-Azobis (2-methylbutyro nitrile) (AMBN), available from Fluka. The mixture was stirred for 30 minutes under a nitrogen atmosphere. The initiator is completely dissolved during this time period.

An aqueous phase was prepared by dissolving 50 g Methocel K-100 in 1000 g water at 60° C. overnight. The solution is then allowed to cool until it reaches room temperature.

331.5 g of the aqueous phase is added to a 500 mL jacketed reactor equipped with a nitrogen inlet and a anchor-type mechanical stirrer. The organic phase is added and the stirring speed is gently increased to 190 rpm. The suspension is stirred at 190 rpm for 60 minutes under a nitrogen atmosphere.

The temperature is raised to 70° C. and the reaction is left overnight under a nitrogen atmosphere.

After the polymerisation reaction was complete, the reaction mixture was allowed to cool to ambient temperature under a nitrogen atmosphere. The suspension was transferred to a sintered-glass funnel and the aqueous phase was filtered from the polymer. The polymer was washed with 1000 mL distilled water and 2000 mL ethanol. The particles are dried overnight at 65° C.

A macroporous polymer is obtained with an average pore diameter of 312 Å, as determined by mercury porosimetry following standard methods, was obtained.

It is apparent that many modifications and variations of the invention as hereinabove set forth may be made without departing from the spirit and scope thereof. The specific embodiments described are given by way of example only, and the invention is limited only by the terms of the appended claims.

What is claimed is:

1. A method of producing one or more macroporous cross-linked polymer particles, which comprises polymerisation and cross-linking of a monomer mixture consisting of divinyl ether monomers in an inert solvent, wherein the polymerisation is free radical initiated and the divinyl ether monomers are defined by the chemical formula (II)

$$C=C-O-R-O-C=C \tag{II}$$

wherein R can be any group that does not interfere chemically or sterically with the polymerization; and wherein the divinyl ether monomers are selected from the group consisting of cyclohexanedimethanol divinyl ether, butanediol divinyl ether and diethyleneglycol divinyl ether.

2. The method of claim 1, wherein R is selected from cyclohexanedimethylene groups.

3. The method of claim 1, wherein said polymerisation is a suspension polymerisation.

4. The method of claim 1, further comprising modifying the surface of the particles produced by derivatisation of residual vinyl groups.

* * * * *